(12) United States Patent
Henzinger et al.

(10) Patent No.: US 7,386,616 B1
(45) Date of Patent: Jun. 10, 2008

(54) SYSTEM AND METHOD FOR PROVIDING LOAD BALANCED PROCESSING

(75) Inventors: Monika Hildegard Henzinger, Menlo Park, CA (US); Deborah Anne Wallach, Emerald Hills, CA (US); Jeffrey Dean, Menlo Park, CA (US); Sanjay Ghemawat, Mountain View, CA (US); Benjamin Thomas Smith, Mountain View, CA (US); Luiz Andre Barroso, Mountain View, CA (US)

(73) Assignee: Google Inc., Mountain View, CA (US)

( * ) Notice: Subject to any disclaimer, the term of this patent is extended or adjusted under 35 U.S.C. 154(b) by 801 days.

(21) Appl. No.: 10/447,256

(22) Filed: May 27, 2003

Related U.S. Application Data

(60) Provisional application No. 60/469,510, filed on May 9, 2003.

(51) Int. Cl.
*G06F 15/173* (2006.01)
(52) U.S. Cl. .................................... 709/226
(58) Field of Classification Search ................ 709/213, 709/214, 215, 223, 225, 226, 216; 715/969, 715/516, 734, 736
See application file for complete search history.

(56) References Cited

U.S. PATENT DOCUMENTS

| | | | |
|---|---|---|---|
| 5,423,037 A | 6/1995 | Hvasshovd | |
| 5,555,404 A | 9/1996 | Torbjørnsen et al. | |
| 6,070,191 A * | 5/2000 | Narendran et al. | 709/226 |
| 6,223,209 B1 | 4/2001 | Watson | |
| 6,269,375 B1 | 7/2001 | Ruddy et al. | |
| 6,374,336 B1 | 4/2002 | Peters et al. | |
| 6,405,220 B1 | 6/2002 | Brodersen et al. | |
| 6,415,373 B1 | 7/2002 | Peters et al. | |
| 6,421,687 B1 | 7/2002 | Klostermann | |
| 6,449,688 B1 | 9/2002 | Peters et al. | |
| 6,467,046 B1 | 10/2002 | Cunliffe et al. | |
| 6,510,428 B2 | 1/2003 | Tsuchida et al. | |
| 6,523,036 B1 | 2/2003 | Hickman et al. | |
| 6,721,794 B2 * | 4/2004 | Taylor et al. | 709/217 |
| 6,754,681 B2 | 6/2004 | Brodersen et al. | |
| 6,760,808 B2 | 7/2004 | Peters et al. | |
| 6,785,768 B2 | 8/2004 | Peters et al. | |
| 6,807,546 B2 | 10/2004 | Young-Lai | |
| 6,862,689 B2 | 3/2005 | Bergsten et al. | |
| 7,043,471 B2 * | 5/2006 | Cheung et al. | 707/3 |
| 2002/0194345 A1 * | 12/2002 | Lu et al. | 709/227 |
| 2003/0059030 A1 * | 3/2003 | Tenorio | 379/300 |
| 2003/0079019 A1 * | 4/2003 | Lolayekar et al. | 709/226 |
| 2003/0088544 A1 * | 5/2003 | Kan et al. | 707/3 |
| 2004/0083289 A1 * | 4/2004 | Karger et al. | 709/226 |
| 2004/0111441 A1 * | 6/2004 | Saito et al. | 707/200 |
| 2004/0148306 A1 * | 7/2004 | Moulton et al. | 707/101 |
| 2006/0218265 A1 * | 9/2006 | Farber et al. | 709/223 |

* cited by examiner

*Primary Examiner*—Saleh Najjar
*Assistant Examiner*—Benjamin R Bruckart
(74) *Attorney, Agent, or Firm*—Morgan, Lewis & Bockius LLP

(57) ABSTRACT

A system and method for providing load balanced processing is described. One or more files selected from a set of files are logically duplicated. At least one file and at least one logically duplicated file, is stored at one of a plurality of servers as specified in a load balancing layout. Execution of each operation in an operation stream is scheduled on the server storing at least one staged file required by the operation.

14 Claims, 16 Drawing Sheets

140

SYSTEM AND METHOD FOR PROVIDING LOAD BALANCED PROCESSING

CROSS-REFERENCE TO RELATED APPLICATION

This non-provisional patent application claims priority under 35 USC § 119(c) to U.S. provisional patent application Ser. No. 60/469,510, entitled "System And Method For Providing Load Balanced Processing," filed May 9, 2003, the disclosure of which is incorporated by reference.

FIELD OF THE INVENTION

The present invention relates in general to load balancing and, in particular, to a system and method for providing load balanced processing.

BACKGROUND OF THE INVENTION

Throughput is an important and crucial metric used to measure system performance in numerous areas of endeavor, such as banking, databases, and searching. Throughput is generally expressed in terms of number of operations or transactions performed per given time unit, such as queries per second. Optimizing throughput is important for several reasons. First, empirically, an average human user can perceive a response delay longer than three tenths of a second. Thus, throughput directly effects the ability of a server to minimize such human-perceivable delays.

Throughput also directly effects the ability of a server to keep pace with operation or transaction processing volume. For example, Web content search engines often process in excess of several thousand queries per second over several billion pages of Web content. This processing load exceeds the capabilities of most current monolithic computer system architectures. Consequently, search engines, as well as most other forms of operation and transaction processing systems, have trended towards including system components consisting of combinations of loosely- and tightly-coupled multi-processing architectures, which offer higher overall processing capabilities and favorable scalability.

Nevertheless, although an effective alternative to monolithic architectures, multiprocessing architectures have limitations, which can often be alleviated through load balancing. For instance, multiprocessing overhead in an untuned system can potentially hinder throughput. Without effective load balancing, merely increasing the number of individual systems utilized within a multiprocessing architecture can fail to satisfactorily increase throughput due to the increased complexity required to coordinate and synchronize operation or transaction processing. Load balancing attempts to avoid overhead problems and works to distribute the processing load over each server for effective utilization.

Independent of system architecture, throughput can be affected by the nature of the operations or transactions performed during execution. For instance, comprehensively searching or evaluating as many available Web pages as possible is an important part of providing the highest quality search results for Web content search engines. Each Web page must be evaluated or referenced as part of a query execution. As a result, access to each Web page becomes crucial to avoid allowing query execution to become data-bound due to a bottleneck restricting access to the required Web page. The data bottleneck problem is pervasive throughout other areas of endeavor and effectively laying out data for access by multiple systems is a critical part of load balancing.

One conventional approach to load balancing distributes target files over a set of multiprocessing systems with one target file per system. This approach, though, can create data bottlenecks, which hinder throughput when multiple systems attempt to access the same file. As well, this approach only provides static load balancing that cannot be adjusted for current actual work load. Dynamic load balancing is possible by introducing a centralized work load manager, but latencies increase and the data bottleneck problem remains.

Another conventional approach to load balancing measures throughput on a file-by-file basis and attempts to normalize the number of files assigned to each system to thereby improve the average time per operation or transaction. However, this approach relies on the assumption that all operations or transactions require the same amount of processing time and fails to provide improved throughput when individual operations or transactions vary in terms of processing times and file accesses.

Accordingly, there is a need for providing an effective layout of files for use in processing operations in a multi-processing architecture, whereby each operation requires access to at least one file. Preferably, one or more of the files are duplicated and distributed over multiple servers by specifying a layout arrangement.

There is a further need for providing effective scheduling of operation execution in a multiprocessing architecture. Preferably, those servers having a substantially minimal work load would be favored and outstanding operations would be tracked as an indication of actual overall system work load.

SUMMARY OF THE INVENTION

An embodiment provides a system and method for providing load balanced processing. One or more files selected from a set of files are logically duplicated. At least one file and at least one logically duplicated file, is stored as a staged file at one of a plurality of servers as specified in a load balancing layout. Execution of each operation in an operation stream is scheduled on the server storing at least one staged file required by the operation.

A further embodiment provides a system and method for load balancing a file distribution. At least one original file selected from a set of files is stored as a staged file on one of a plurality of servers. A duplicate file of at least one such original file is distributed over the servers. For each such duplicate file, at least one server other than one of the servers storing at least one staged file as a duplicate file is identified and the duplicate file of the at least one such original file is stored as a staged file on the at least one server.

A further embodiment provides a system and method for load balancing a file distribution using a layout graph. At least one original file selected from a set of files is stored as a staged file on one of a plurality of servers. Each server corresponds to a node in a layout graph. A duplicate file of at least one such original file is distributed over the servers. For each such duplicate file, each node in the layout graph corresponding to each server storing at least one staged file as a duplicate file is marked. The at least one server corresponding to at least one node in the layout graph that is not marked is identified. The duplicate file of the at least one such original file is stored as a staged file on the at least one identified server.

Still other embodiments of the present invention will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

System Topology and Overview

Figure 1:
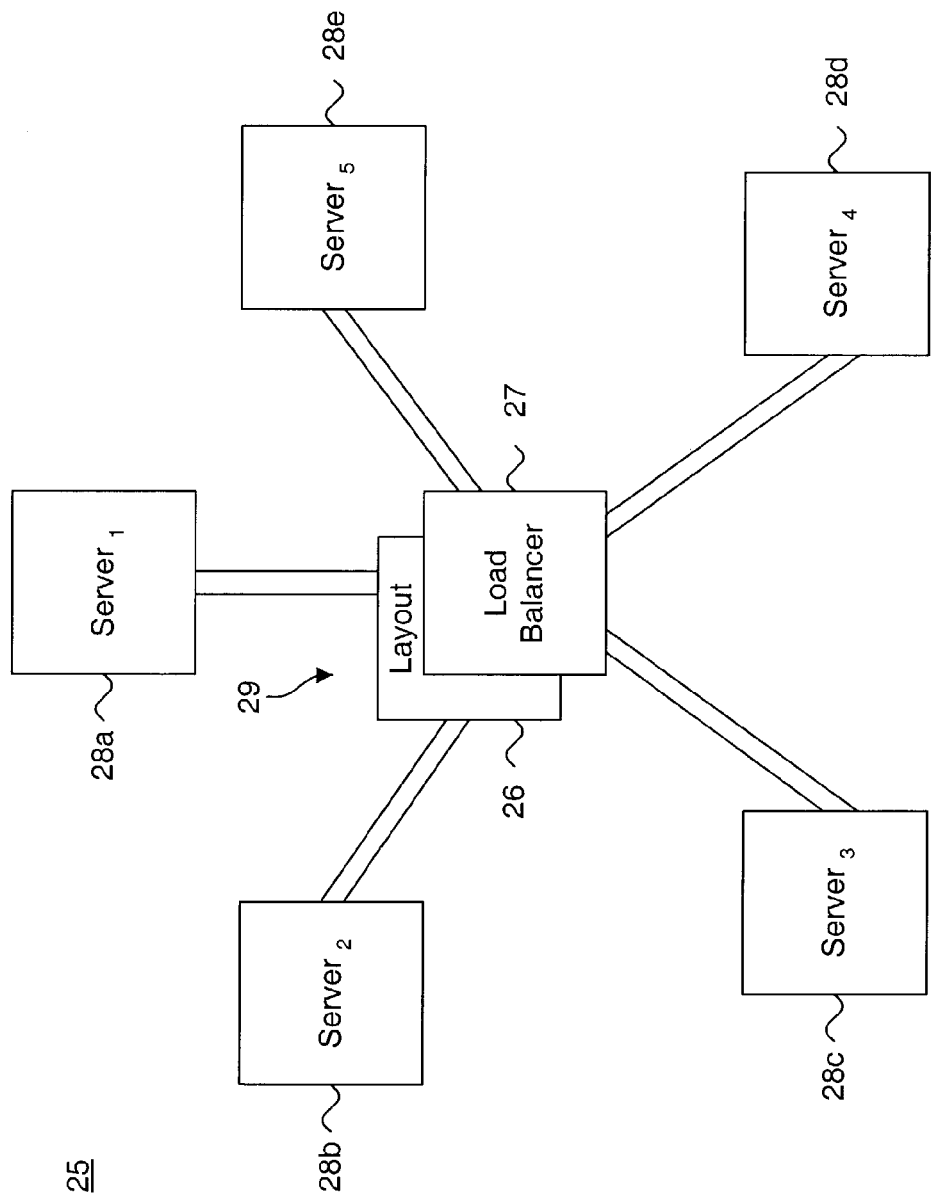
FIG. 1 is a block diagram showing, by way of example, a topology for a system for providing load balanced processing, in accordance with the present invention.

FIG. 1 is a block diagram showing, by way of example, a topology for a system 25 for providing load balanced processing, in accordance with the present invention. The system 25 consists of a set of servers 28*a-e*, which are physically or logically interconnected over a network 29 to a layout component 26 and a load balancer 27. The layout component 26, load balancer 27, and servers 28*a-e* are functionally discrete components, although the operations performed by each component could be combined within a single system or distributed over a plurality of individual systems in a multiprocessing arrangement.

In the described embodiment, operations are load balanced between the servers 28*a-e*. The system topology preferably adheres to a load balancing variant, expressed by equation (1):

$$k \times n \geq m + n \quad (1)$$

which simplifies to equation (2):

$$k \geq \frac{m}{n} + 1 \quad (2)$$

where k is the maximum number of files that can be stored at a server 28*a-e*, expressed as "slots," over all servers 28*a-e*; m is the number of files to be stored, exclusive of any duplicate files; and n is the number of servers 28*a-e* available. Other load balancing variants could be used in lieu of equation (2), as would be recognized by one skilled in the art.

The system 25 executes operations, which can originate either from outside of or from within the system itself. The operations include various forms of computer-executable instructions, operations, transactions, and similar directives, which each require access to one or more files. The files consist of stored data of various types, forms, and structure, as are known in the art. Prior to commencing execution of the operations, the layout component 26 determines a load balancing layout for the servers 28*a-e*, which is used to store the files and duplicates of at least one of the files, on the individual servers 28*a-e*, as further described below with reference to FIG. 4. During execution of operations, the load balancer 27 schedules operation executions on each server 28*a-e* based on the locations of the files and duplicated files and other topological- and load-related factors and returns a result, as further described below with reference to FIG. 6. Each operation is dispatched by the load balancer 27, or equivalent component, to a server 28*a-e* as an operation pair (not shown), which matches an operation to one or more files required by the operation, as further described below with reference to FIG. 2. Finally, each server 28*a-e* processes the operation and returns intermediate results, as further described below with reference to FIG. 7.

In the described embodiment, the layout component 26, load balancer 27, and servers 28*a-e* are separate systems arranged in a multiprocessing architecture with communication occurring only between the layout component 26 and each server 28*a-e* and the load balancer 27 and each server 28*a-e*, although various other arrangements and configurations are possible, as would be recognized by one skilled in the art. As well, the servers 28*a-e* could be arranged in various multiprocessing arrangements, structures, levels, hierarchies, and tiers, as would be recognized by one skilled in the art. The network 29 includes various topologies, configurations, and arrangements of network interconnectivity components arranged to interoperatively couple with enterprise, wide area and local area networks, including the Internet, and include, without limitation, conventionally wired, wireless, satellite, optical, and equivalent network technologies, as would be recognized by one skilled in the art The individual computer systems, including layout component 26, load balancer 27, and servers 28*a-e*, include general purpose, programmed digital computing devices consisting of a central processing unit (processors 13 and 16, respectively), random access memory (memories 14 and 17, respectively), non-volatile secondary storage 15, such as a hard drive or CD ROM drive, network or wireless interfaces, and peripheral devices, including user interfacing means, such as a keyboard and display. Program code, including software programs, and data is loaded into the RAM for execution and processing by the CPU and results are generated for display, output, transmittal, or storage.

Operation Pair Structure

Figure 2:
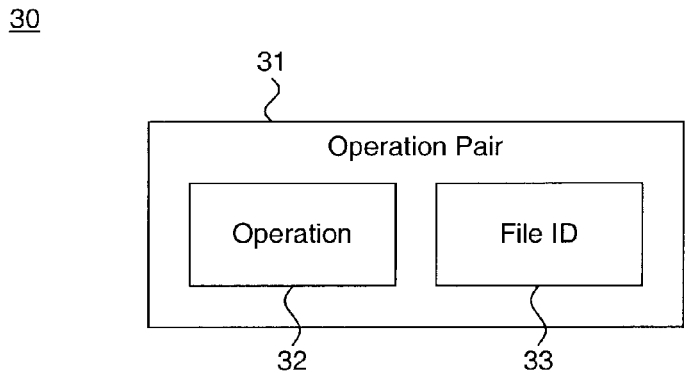
FIG. 2 is a data structure diagram showing an operation pair used in the system of FIG. 1.

FIG. 2 is a data structure diagram 31 showing an operation pair 31 used in the system 25 of FIG. 1. Each operation requires some type of access to one or more files in a set of files and those files required by the operation are identifiable from the operation itself. In the described embodiment, each operation requires access to substantially all of the files. The methodologies described herein apply equally to operations requiring access to one, several or all files in a set of files.

Each operation pair 31 matches an operation 32 to a file identifier (ID) 33 that identifies one of the files required by the operation 32. Those operations requiring a set of files are formed into multiple operation pairs 31, one operation pair 31 per file. During operation execution, the load balancer 27, or equivalent component, dispatches each operation pair 31 to at least one server 28a-e that stores the file identified by the file identifier 33 for the operation 32.

Search Execution and Search Results Processing

Figure 3:
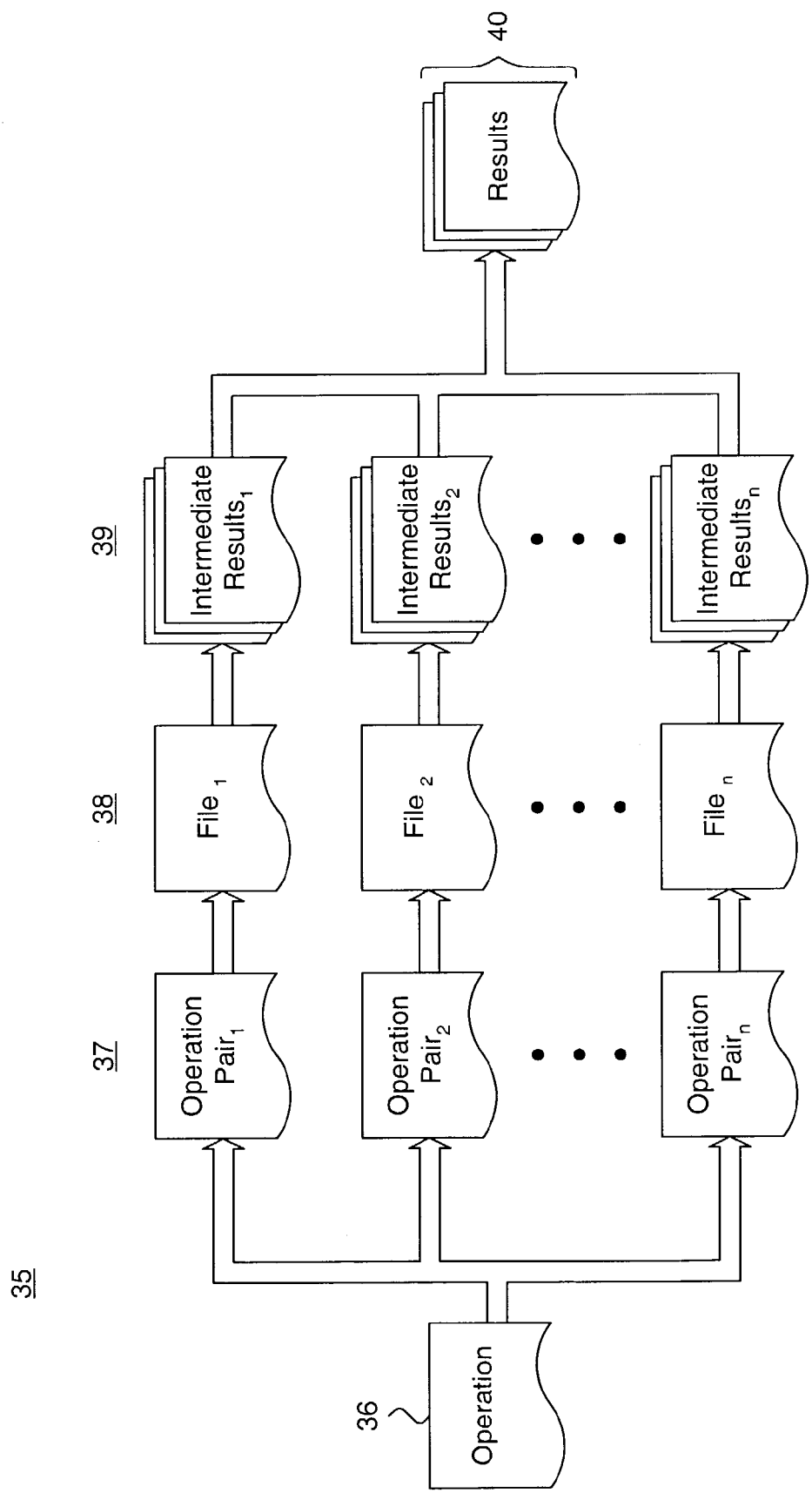
FIG. 3 is a process flow diagram showing operation execution and results processing by the system of FIG. 1.

FIG. 3 is a process flow diagram 35 showing operation execution and results processing by the system 25 of FIG. 1. Initially, an operation 36 is received and formed into a set of operation pairs 37 with one operation pair 37 per file 38 required by the operation 36. Note that only one operation pair 36 is formed for an operation 36 requiring only one file 38. The operation pairs 37 are dispatched to individual servers 28a-e, which each process the operation on the specified file 38 and generate intermediate results 39. The intermediate results 39 are then processed into a set of results 40.

Layout Component Modules

Figure 4:
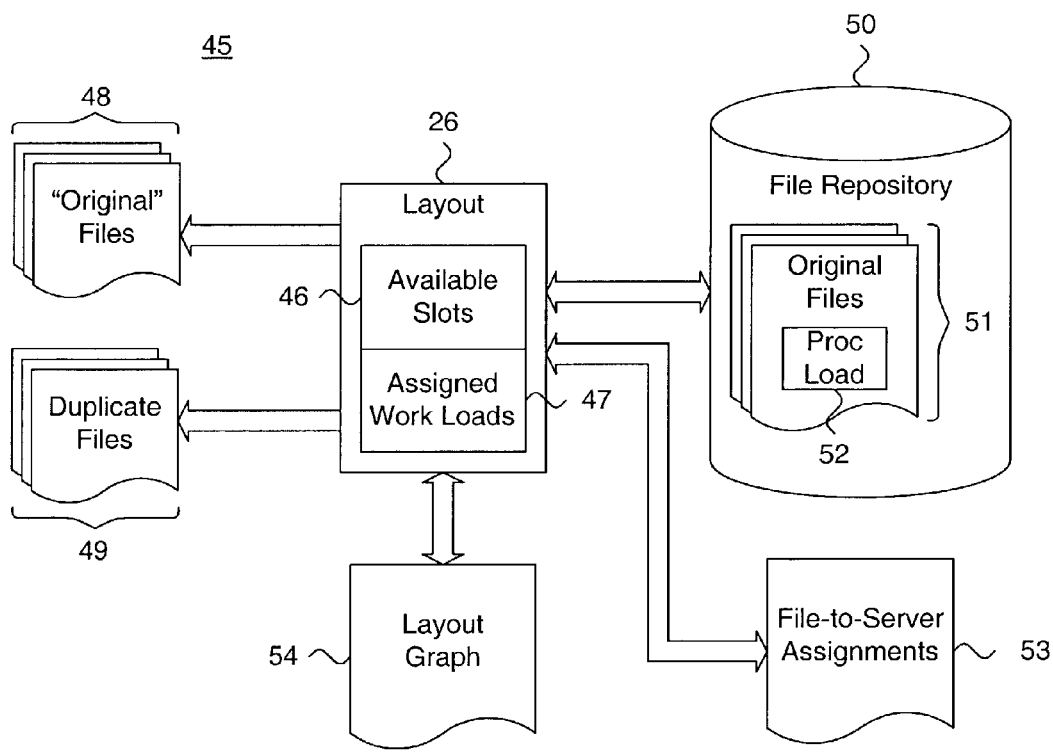
FIG. 4 is a functional block diagram showing the software modules used by the layout component of FIG. 1.

FIG. 4 is a functional block diagram showing the software modules 45 used by the layout component 26 of FIG. 1. The layout component 26 determines file and duplicate file storage prior to commencement of operation execution and operates in two phases: layout determination and storage. The layout component 26 includes a file repository 50 storing original files 51, at least one of which is required by an operation. In a further embodiment, a processing load 52 is calculated and associated with each original file 51. In the described embodiment, each processing load 52 consists of the inverse of the throughput required to process the original file 51. The throughput is expressed as operations per second and the inverse is expressed as seconds per operation, although other expressions of processing load could be used, as would be recognized by one skilled in the art.

During the layout determination phase, the layout component 26 determines a layout for storing the files on the servers 28a-e. The layout specifies a distribution for storing the original files 51 and at least one duplicate of one or more of the original files 51 on the servers 28a-e with the goal of substantially optimizing throughput with the few machines. The layout component 26 keeps track of the available slots 46 for storing the "original" files 48 and duplicate files 49 at each server 28a-e during layout determination.

In the described embodiment, the number of files duplicated can be less than the number of servers 28a-e. However, the number of duplicated files preferably equals at least the number of servers 28a-e. The storage assignments for those original files 51 that are duplicated is specified using a layout graph 54 and the mapping of files 48 and duplicate files 49 to the servers 28a-e upon which each is stored is specified in a file-to-server assignments 53.

At a minimum, the layout component 26 generates a connected layout, as further described below with reference to FIG. 5. As further described below respectively with reference to FIGS. 10-13, the layout component 26 can also generate, by way of example, default, greedy, cycle, and cycle greedy layouts, although other layouts are feasible.

During the storage phase, the layout component 26 distributes the files 48 and duplicate files 49 to the servers 28a-e for storage. The layout component 26 retrieves the original files 51 from the file repository 50 and sends either an "original" file 48 or a duplicate file 49 to an assigned server 28a-e. Note that both the "original" file 48 and duplicate file 49 are both duplicates of the original file 51 when sent to the assigned server 28a-e and are only described as being duplicated for purposes of describing the layout graph 54. Similarly, each server 28a-e draws no distinction between "original" files 48 and duplicate files 49 and merely stores both as files. In addition, any other component could perform the storage phase, given the mapping specified in the file-to-server assignments 53.

Load Balancer Modules

Figure 5:
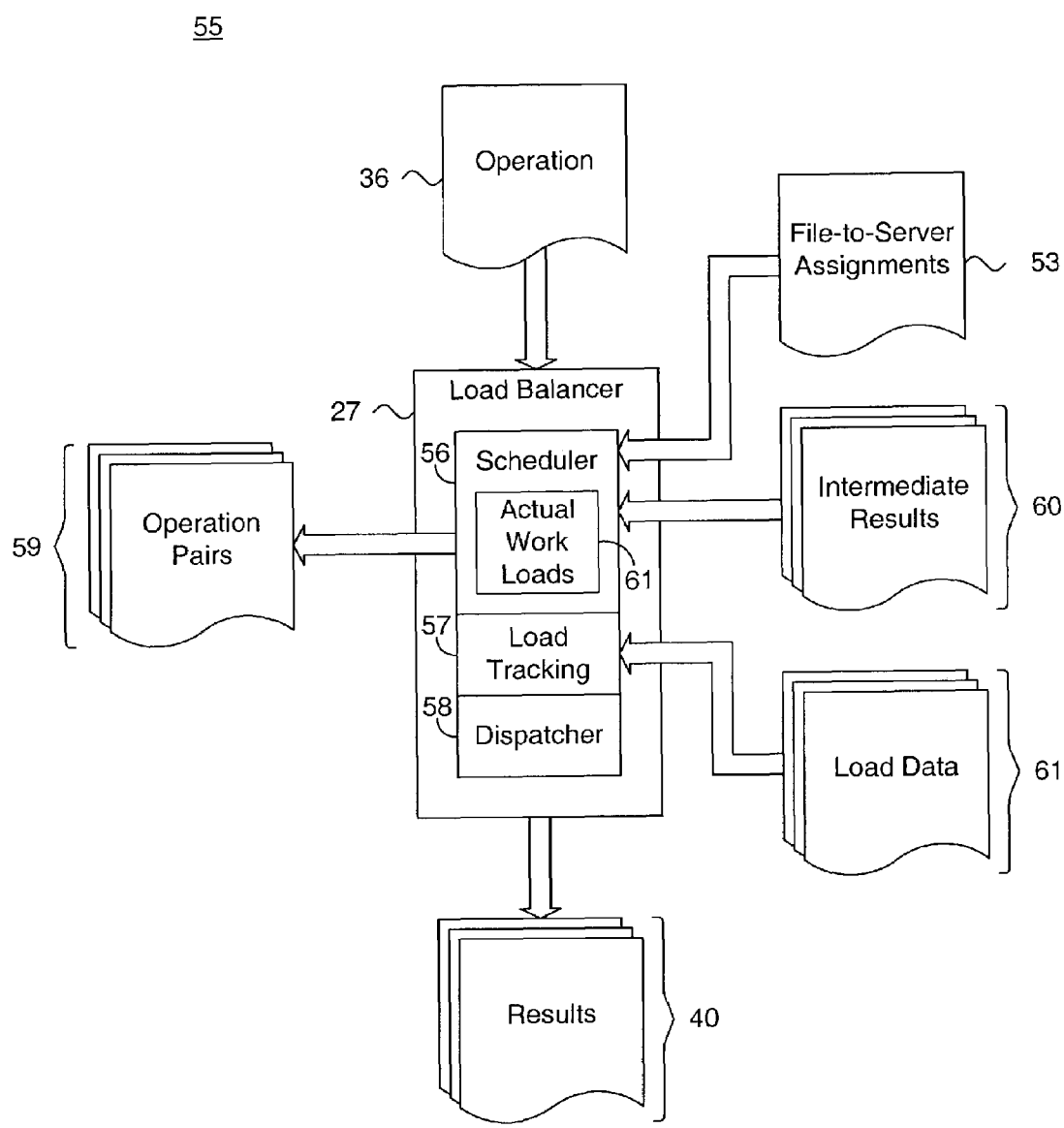
FIG. 5 is a functional block diagram showing the software modules used by the load balancer of FIG. 1.

FIG. 5 is a functional block diagram showing the software modules 55 used by the load balancer 27 of FIG. 1. The load balancer 27 operates continuously during operation execution to schedule execution of each operation on the servers 28a-e. The load balancer 27 consists of three modules: scheduler 56, load tracking module 57, and dispatcher 58. The scheduler 56 schedules execution of each operation 36. The scheduler 56 forms operation pairs 59, as described above with reference to FIG. 2, which each specify one file from the set of files required by the operation 36. If a file is duplicated to a plurality of servers 28a-e, the scheduler 56 selects the server 28a-e having a minimal actual work load based on load data 61, as further described below with reference to FIGS. 15-16. Optionally, the scheduler 56, or any other equivalent component, receives intermediate results 60 from the servers 28a-e and processes the intermediate results 60 into a set of results 40.

The dispatcher 58 dispatches each operation pair 59 to the server 28a-e based on the mapping specified in the file-to-server assignments 53. Any other component could dispatch each operation pair 59, given the mapping specified in the file-to-server assignments 53.

The load tracking module 57 tracks the current actual work loads 61 during execution for each server 28a-e. Load data 61 is periodically received from each server 28a-e. In the described embodiment, the load data 61 consists of the number of outstanding operations on a given server 28a-e. In a further embodiment, the load data 61 also includes an average of the inverse of throughput over a specified time interval for use in dynamic scheduling, although other expressions of actual work load could be used, as would be recognized by one skilled in the art.

Server Modules

Figure 6:
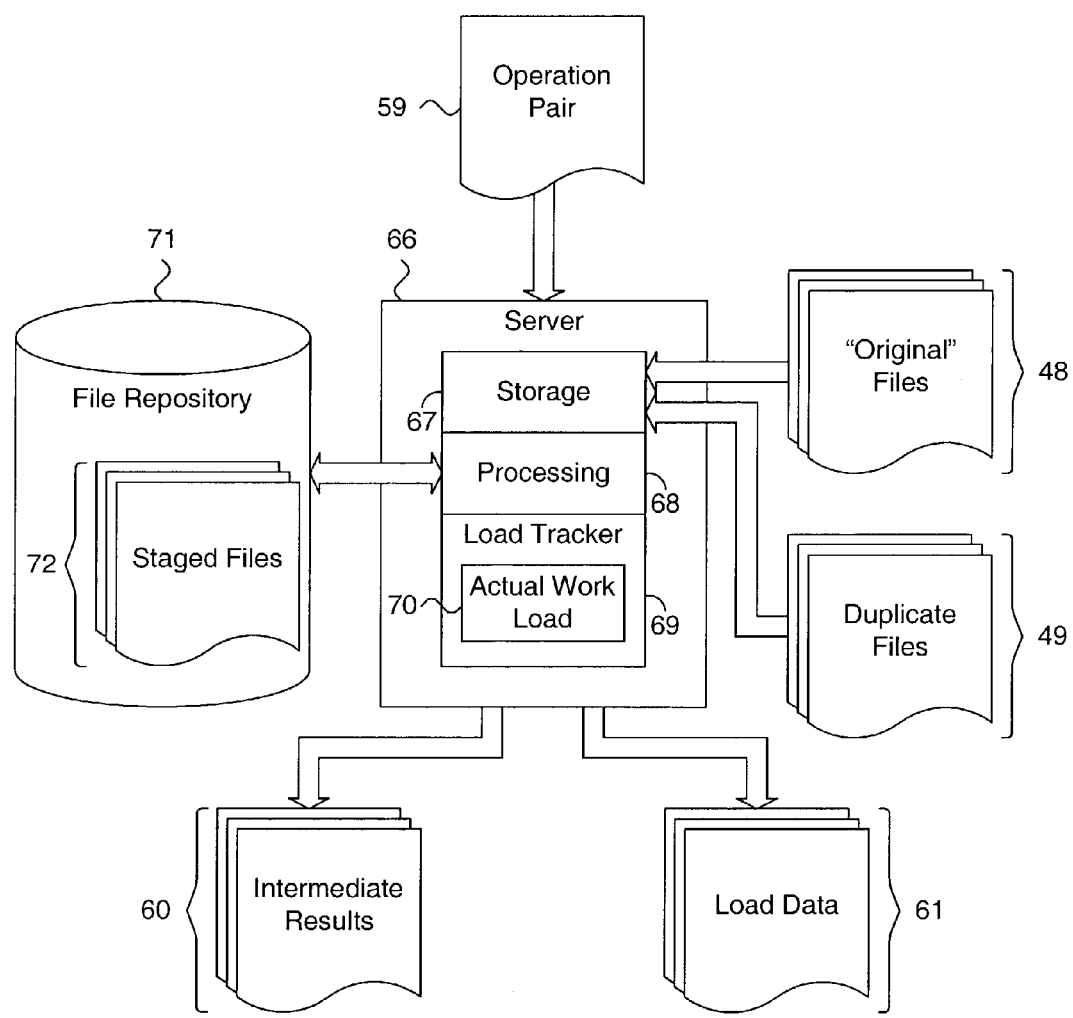
FIG. 6 is a functional block diagram showing the software modules used by each server of FIG. 1.

FIG. 6 is a functional block diagram showing the software modules 65 used by each server 66 of FIG. 1. Each server 66 operates continuously during operation execution to process operation pairs 59. Each server 66 consists of three modules: storage module 67, processing module 68, and load tracker module 69. The storage module 67 stores each "original" file 48 and duplicate file 49 as staged files 72 in a file repository 71. Note that both the "original" file 48 and duplicate file 49 are both duplicates of the original file 51 when sent from the assigned server 28a-e and are only described as being duplicated for purposes of describing the layout graph 54. Similarly, each server 28a-e draws no distinction between "original" files 48 and duplicate files 49 and merely stores both as staged files 72.

The processing module 68 executes the operation contained in the operation pair 69 on the specified staged file 72 and generates intermediate results 60. The intermediate results are sent optionally to the load balancer 27, or any other equivalent component, and are processed into a set of results.

The load tracker module 69 sends the load data 61 to the load balancer 27 for use in scheduling execution of operations. In a further embodiment, the load tracker 69 tracks the current actual work load 70 during execution for dynamic scheduling. In the described embodiment, the current actual work load 70 consists of an average of the inverse of throughput over a specified time interval, although other expressions of actual work load could be used, as would be recognized by one skilled in the art.

Connected Layout Determination

Figure 7:
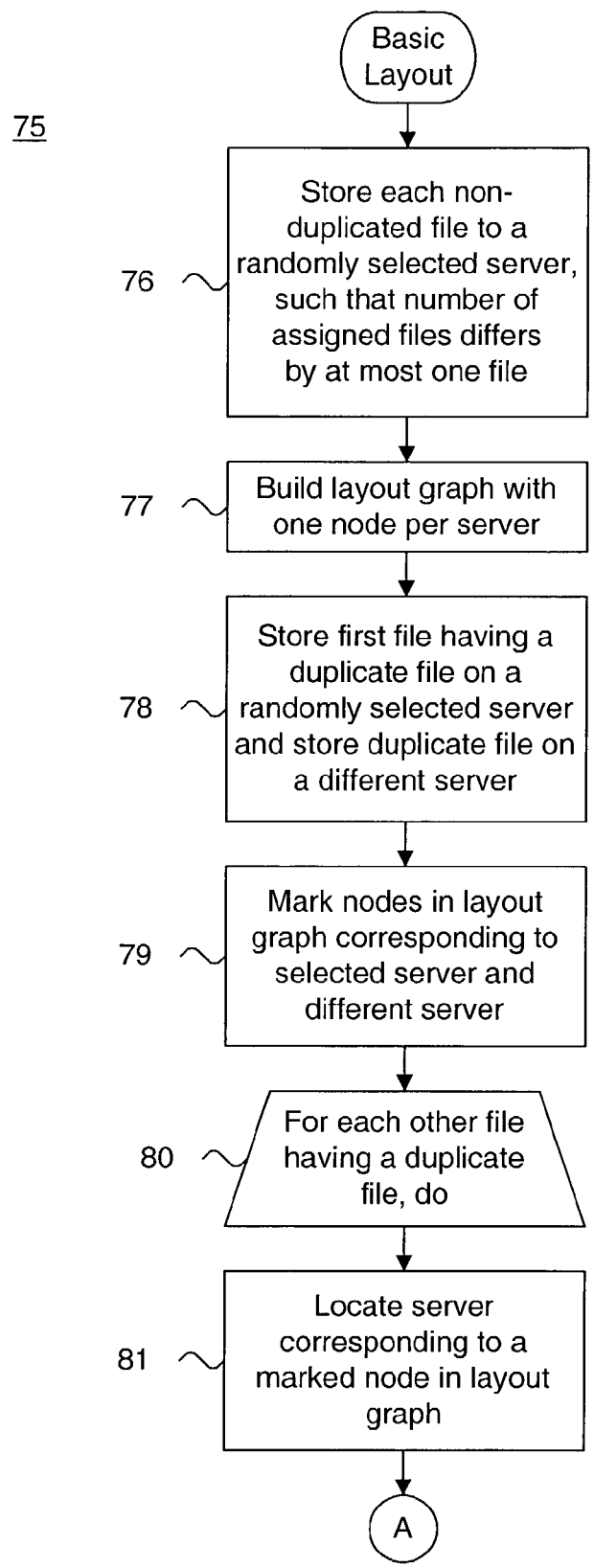
FIG. 7 is a flow diagram showing a method for determining a connected layout for use in the system of FIG. 1.
Figure 7:
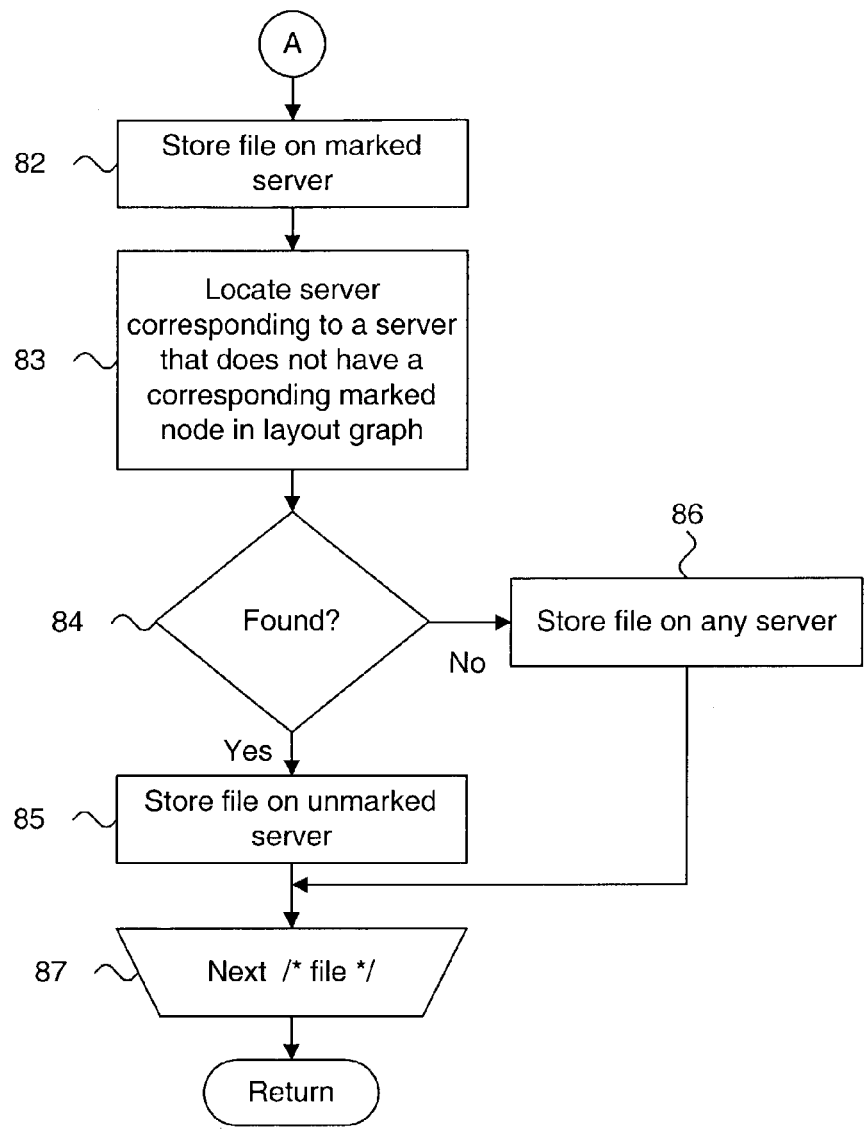

FIG. 7 is a flow diagram showing a method 75 for determining a connected layout for use in the system of FIG. 1. The connected layout assigns files 51 to servers 28a-e where an underlying layout graph 54 forms a graph connecting all nodes. The method can be executed by the layout component 26, or any other equivalent component, to generate a layout graph 54 and to store each non-duplicated and duplicated file on one or more of the servers 28a-e.

First, each non-duplicated file is stored on one of the servers 28a-e in a preferably random way, such that the number of files assigned to each of the servers 28a-e differs in number by at most one when compared to the other servers 28a-e (block 76). Next, a layout graph 54 is built, indicating one node per server 28a-e, for storing the files that have duplicates on the servers (block 77). A first file is stored on a randomly selected server 28a-e and a duplicate of the first file is stored on a different server 28a-e (block 78). The nodes in the layout graph 54 corresponding to the selected server 28a-e and different server 28a-e are marked (block 79).

Each other file that has a duplicate file is processed in an iterative loop (blocks 80-87), as follows. During each iteration (block 80), a server 28a-e corresponding to a marked node in the layout graph 54 is located (block 81) and the file is stored at the marked server 28a-e (block 82). Next, a server 28a-e that does not have a corresponding node that is marked in the layout graph 54 is located (block 83). If such a server 28a-e is found (block 84), the file is stored on the unmarked server 28a-e (block 85). Otherwise, if all servers 28a-e correspond to marked nodes in the layout graph 54 (block 84), the file is stored on any server 28a-e (block 86). Processing continues with the file (block 87). The connected layout is complete and the method ends.

In the described embodiment, files are stored at the servers 28a-e without regard to the number of files, including duplicated files, already stored at each server 28a-e. In a further embodiment, files are stored at the servers 28a-e to minimize the number of files, including duplicated files, already stored at each server 28a-e and thereby improve the overall distribution of files across the servers 28a-e.

Accordingly, the first file is stored on a server 28a-e with a minimum number of files and the duplicate of the first file is stored on a different server 28a-e with a minimum number of files. For each other file that has a duplicate file, the file is stored on a server 28a-e corresponding to a marked node in the layout graph 54 with a minimum number of files and the duplicate of the file is stored on a server 28a-e that does not have a corresponding node that is marked in the layout graph 54 with a minimum number of files, or by selecting a server 28a-e with a minimum number of files, if all servers 28a-e correspond to marked nodes in the layout graph 54.

Other approaches to balancing the distribution of files across the servers 28a-e are possible, as would be recognized by one skilled in the art.

Default File Distribution Topology

Figure 8:
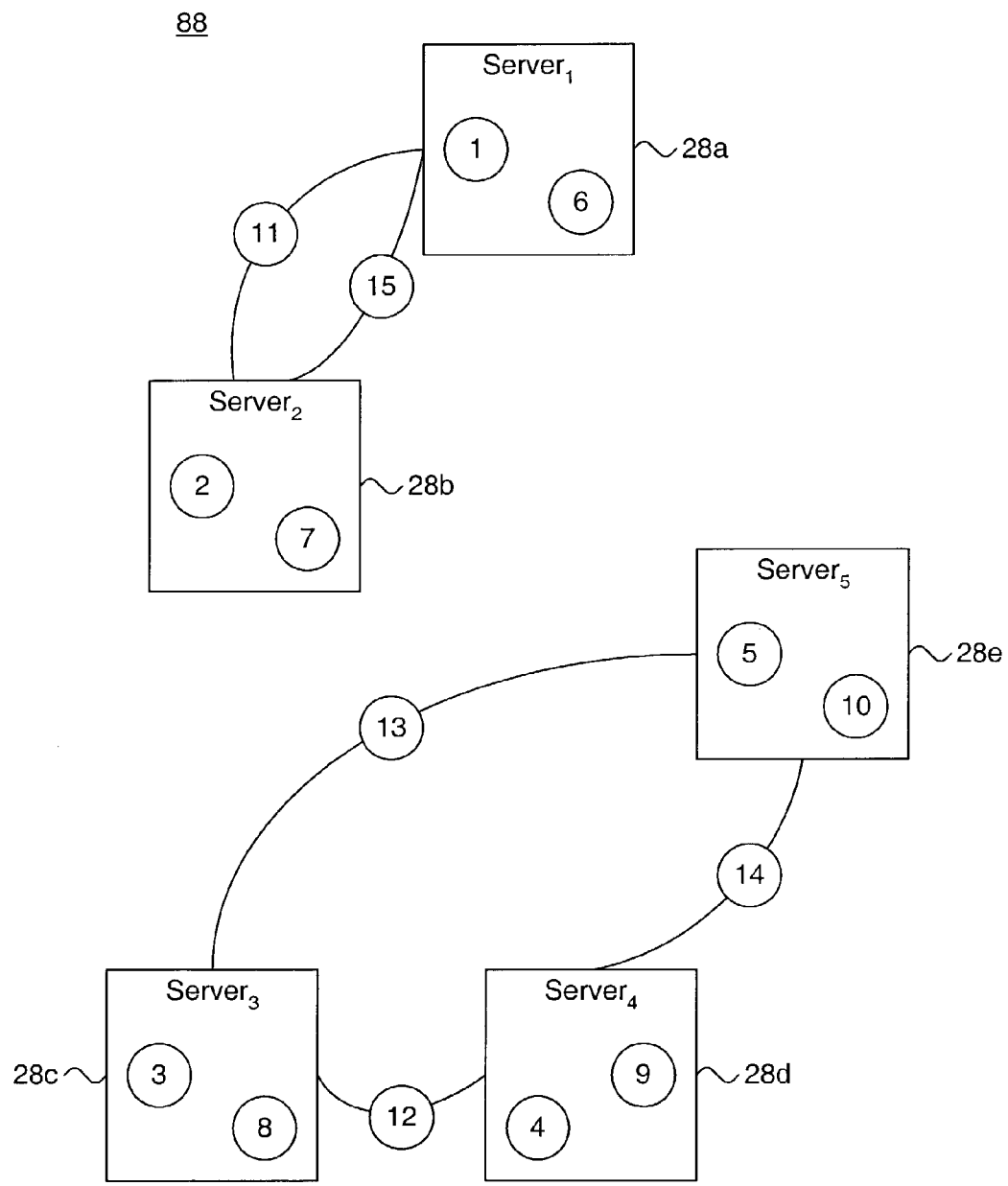
FIG. 8 is a layout graph showing, by way of example, a default layout for use with the servers of FIG. 1.

FIG. 8 is a layout graph 88 showing, by way of example, a default layout for use with the servers 28a-e of FIG. 1. Each server 28a-e corresponds to a node in the layout graph 88 and individual files are shown as circled numbers. Files stored at only one server 28a-e are shown within each node while files stored on two or more servers 28a-e, that is, duplicate files, are shown as edges between each node corresponding to the servers 28a-e at which the file is stored.

Fifteen files are stored at the servers 28a-e. Files "1" and "6" are stored at server 28a. Files "2" and "7" are stored at server 28b. Files "3" and "8" are stored at server 28c. Files "4" and "9" are stored at server 28d. Files "5" and "10" are stored at server 28e. Files "11" and "15" are stored at both server 28a and server 28b. File "12" is stored at both server 28c and server 28d. File "14" is stored at both server 28d and server 28e. Finally, file "13" is stored at both server 28c and server 28e.

Although the files are fairly evenly distributed across all servers 28a-e, the edges in the layout graph 88 defines a graph that connects all nodes, but lacks connectedness and fails to logically define a tree connecting every node. By comparison, the layout graph 89, described below with reference to FIG. 9, forms a graph that connects all nodes. The layout graph 88 contains two cycles, which occur between servers 28a and 28b and between servers 28c, 28d and 28e. As a result, throughput can suffer during execution of operations requiring access to a set of files in a given sequence, as the scheduling of operation execution tends to cascade from one server to another server as each server experiences a processing slowdown. As all of nodes in the layout graph 88 are not connected to each other, the servers in one of the two cycles formed in the layout graph 88, for instance, servers 28a and 28b, can become overloaded, while the servers in the other cycle, that is, servers 28c, 28d and 28e, continue processing without overload. Furthermore, without the connectedness provided by a logically-defined tree, the scheduler 56 is unable to send new incoming operation pairs 59 to the non-overloaded servers 28c, 28d and 28e rather than to the overloaded servers 28a and 28b.

Cycle File Distribution Topology

Figure 9:
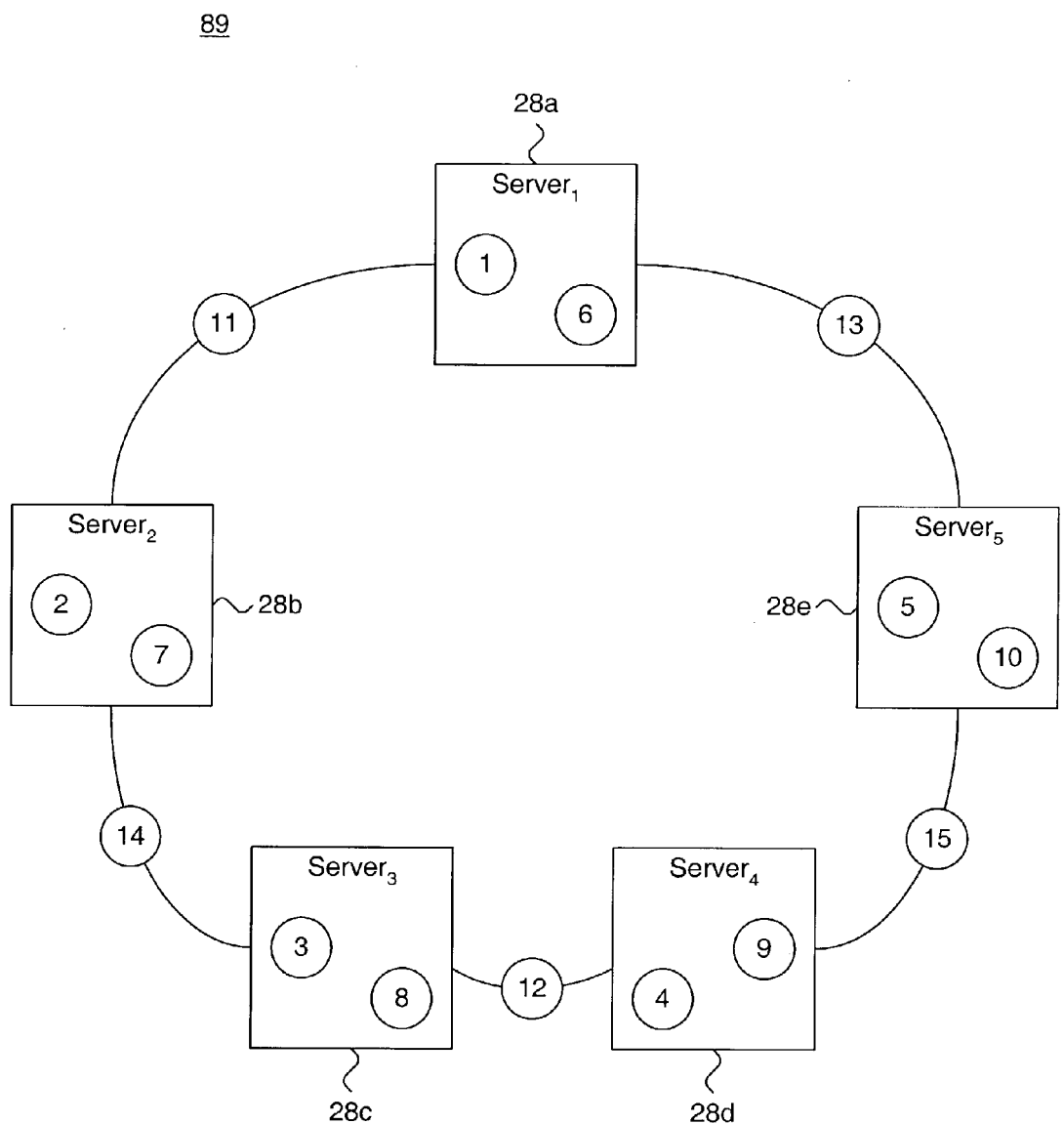
FIG. 9 is a layout graph showing, by way of example, a cycle layout for use with the servers of FIG. 1.

FIG. 9 is a layout graph 89 showing, by way of example, a cycle layout for use with the servers 28a-e of FIG. 1. Where the load balancing variant per equation (1) holds, that is, where k×n≧m+n, the layout graph 88, described above with reference to FIG. 8, can be generated instead as a cycle that connects all nodes rather than just a graph that connects all nodes. The cycle layout can be generated by a connected layout determination method, such as described above with reference to FIG. 7. Each server 28a-e corresponds to a node in the layout graph 89 and individual files are shown as circled numbers. Files stored at only one server 28a-e are shown within each node while files stored on two or more servers 28a-e, that is, duplicate files, are shown as edges between each node corresponding to the servers 28a-e at which the file is stored.

Fifteen files are again stored at the servers 28a-e. Files "1" and "6" are stored at server 28a. Files "2" and "7" are stored at server 28b. Files "3" and "8" are stored at server 28c. Files "4" and "9" are stored at server 28d. Files "5" and "10" are stored at server 28e. File "11" is stored at both server 28a and server 28b. File "14" is stored at both server 28b and server 28*c*. File "12" is stored at both server 28*c* and server 28*d*. File "15" is stored at both server 28*d* and server 28*e*. Finally, file "13" is stored at both server 28*e* and server 28*a*.

The files are evenly distributed across all servers 28*a-e* and the edges in the layout graph 89 exhibit both connectedness and form a cycle connecting every node. As a result, throughput is optimized during execution of operations requiring access to a set of files in a given sequence and the cascading effect, described above with reference to FIG. 8, is avoided, since the layout graph 89 defines a path between any selected pair of nodes. Additionally, since the layout graph 54 logically defines a cycle, rather than a line, the maximum distance between any pair of nodes is $$\frac{n}{2},$$

instead of n−1, where n is the number of nodes in the layout graph 89. Accordingly, load balancing between the servers 28*a-e* corresponding to the nodes in the layout graph 89 can be achieved in a shorter period of time than in a layout graph defining a line. In the described embodiment, connectedness and, preferably, forming a cycle, are favored due to the optimization on throughput generally gained.

Method Overview

Figure 10:
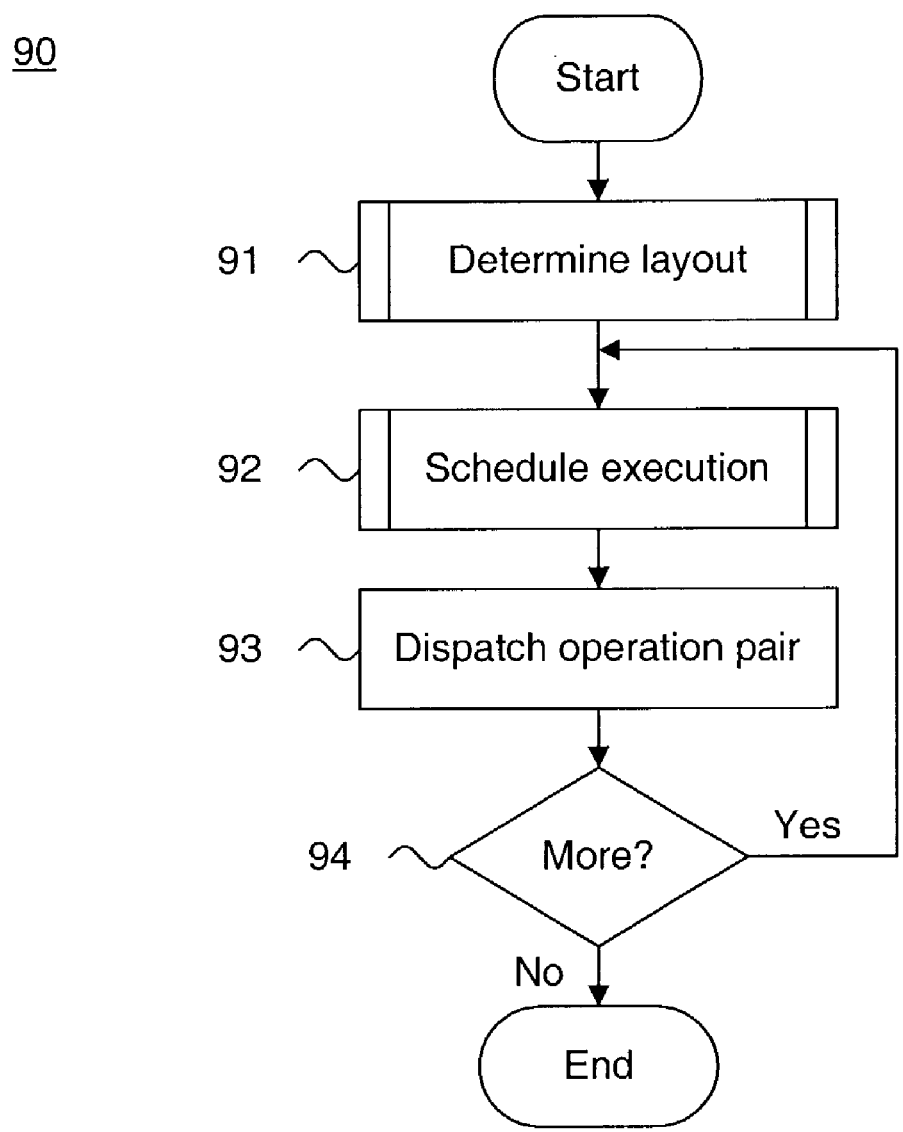
FIG. 10 is a flow diagram showing a method for providing load balanced processing, in accordance with the present invention.

FIG. 10 is a flow diagram showing a method 90 for providing load balanced processing, in accordance with the present invention. The method 90 is described as a sequence of process operations or steps, which can be executed, for instance, by the system of FIG. 1, or equivalent components.

The method proceeds by first determining a layout for storing the files and at least one duplicate of one or more of the files on the servers 28*a-e* (block 91), as further described above with reference to FIG. 7 and below with reference to FIGS. 11-14. The method then continuously schedules execution of operations (block 92), as further described below with reference to FIGS. 15-16. Each operation pair 59 is dispatched to an assigned server 28*a-e* (block 93). Processing continues if more operations are received (block 94), after which the method terminates.

Default Layout Determination

Figure 11:
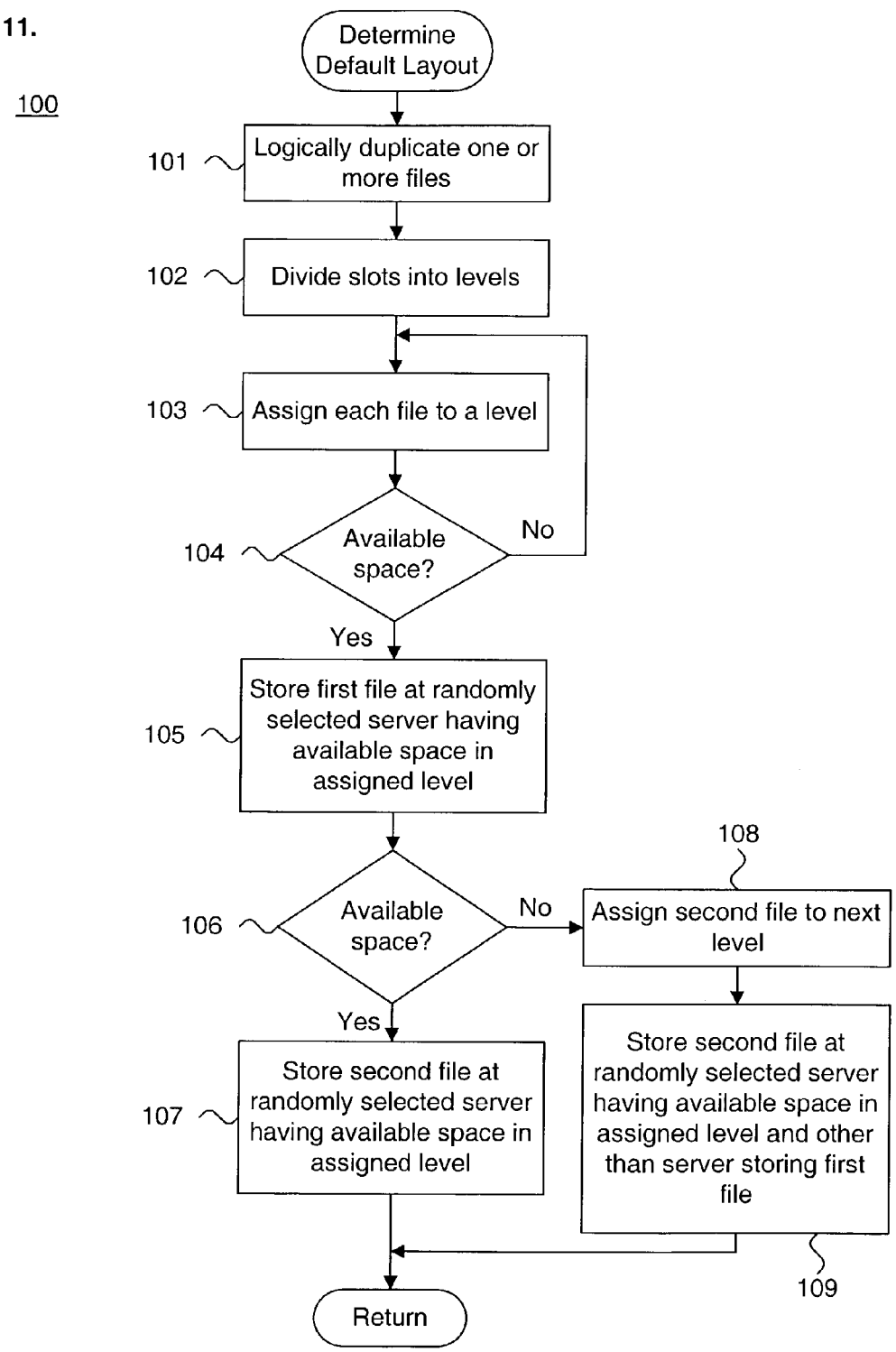
FIG. 11 is a flow diagram showing a routine for determining a default layout for use in the method of FIG. 10.

FIG. 11 is a flow diagram showing a routine 100 for determining a default layout for use in the method 90 of FIG. 10. The default layout simply assigns files 51 to randomly selected servers 28*a-e* having available space by assigned levels.

First, one or more files 51 are logically duplicated from the set of files required by one or more operation 36 (block 101). The available slots 46 are divided into levels (block 102) by sequentially numbering all of the available slots 46 on each server 28*a-e*, starting from '1' or any other consistent value. All the available slots 28*a-e* having the same number form a level. For instance, the available slots 46 numbered '1' on each of the servers 28*a-e* form one level. Each file 51 is then assigned to a level (block 103). If no servers 28*a-e* in the assigned level has available space (block 104), the file 51 is assigned to the next level (block 103). Otherwise, if space is available in the assigned level (block 104), a first file 51 is stored at a randomly selected server 28*a-e* having available space in the assigned level (block 105). Similarly, if space is still available in the assigned level (block 106), a second file 51 is stored at another randomly selected server 28*a-e* having available space in the assigned level (block 107). Otherwise, if no space is available (block 106), the second file 51 is assigned to the next level (block 108) and is stored at another randomly selected server 28*a-e* having available space in the assigned level and other than the server 28*a-e* at which the first file 51 is stored (block 109). The default layout is complete and the routine returns.

Greedy Layout Determination

Figure 12:
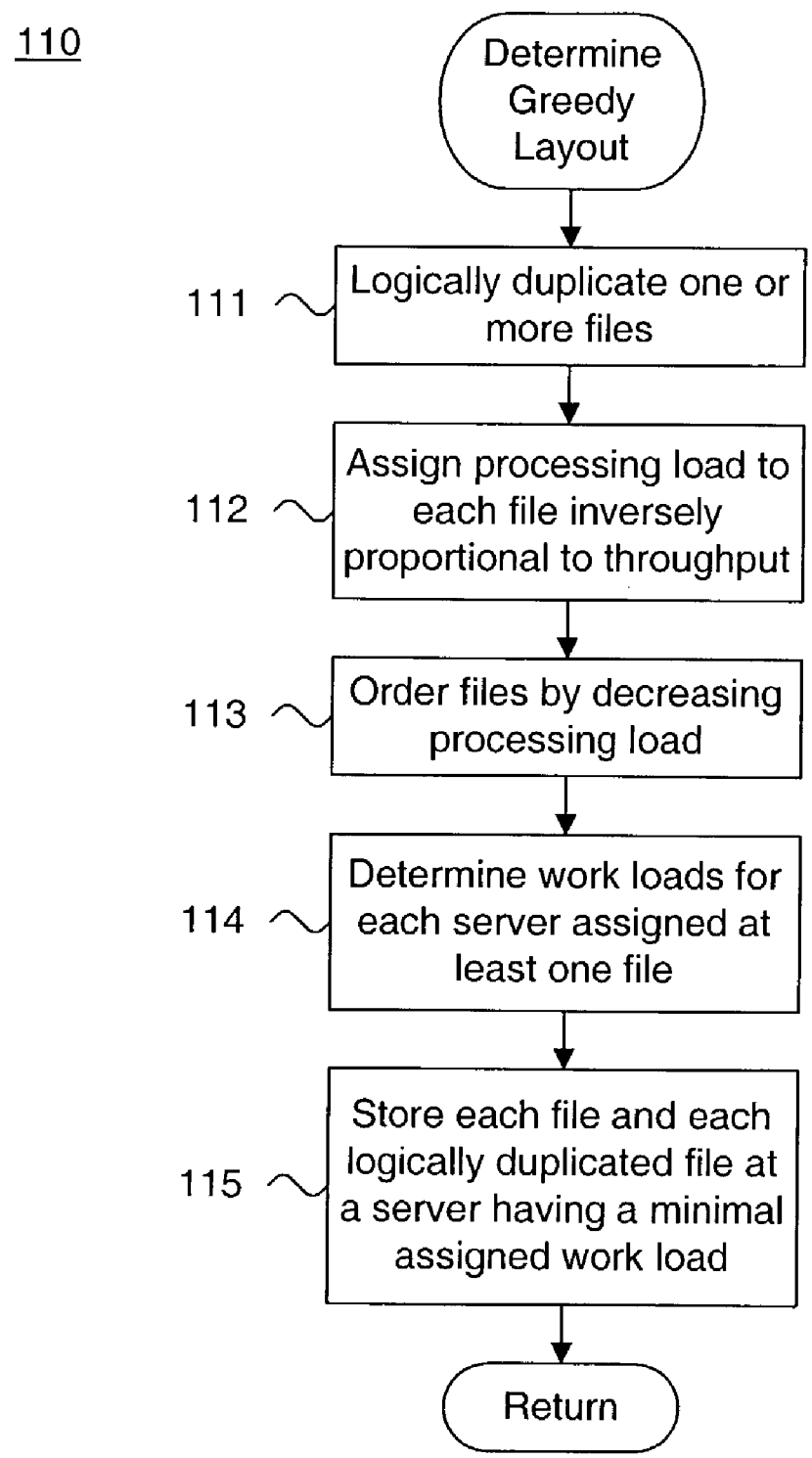
FIG. 12 is a flow diagram showing a routine for determining a greedy layout for use in the method of FIG. 10.

FIG. 12 is a flow diagram showing a routine 110 for determining a greedy layout for use in the method 90 of FIG. 10. The greedy layout assigns files 51 to servers 28*a-e* having minimal assigned work loads.

First, one or more files 51 are logically duplicated from the set of files required by one or more operation 36 (block 111). A processing load 52 is assigned to each file 51 (block 112). In the described embodiment, the assigned processing load 52 consists of the inverse of the throughput required to process the original file 51. The files 51 are ordered, preferably by decreasing assigned processing load 52 (block 113). An assigned work load 47 is determined for each server 28*a-e* assigned at least one file 51 (block 114). Finally, each "original" file 48 and duplicate file 49 is stored at a server 28*a-e* having a minimal assigned work load 47 (block 115). The greedy layout is complete and the routine returns.

Cycle Layout Determination

Figure 13:
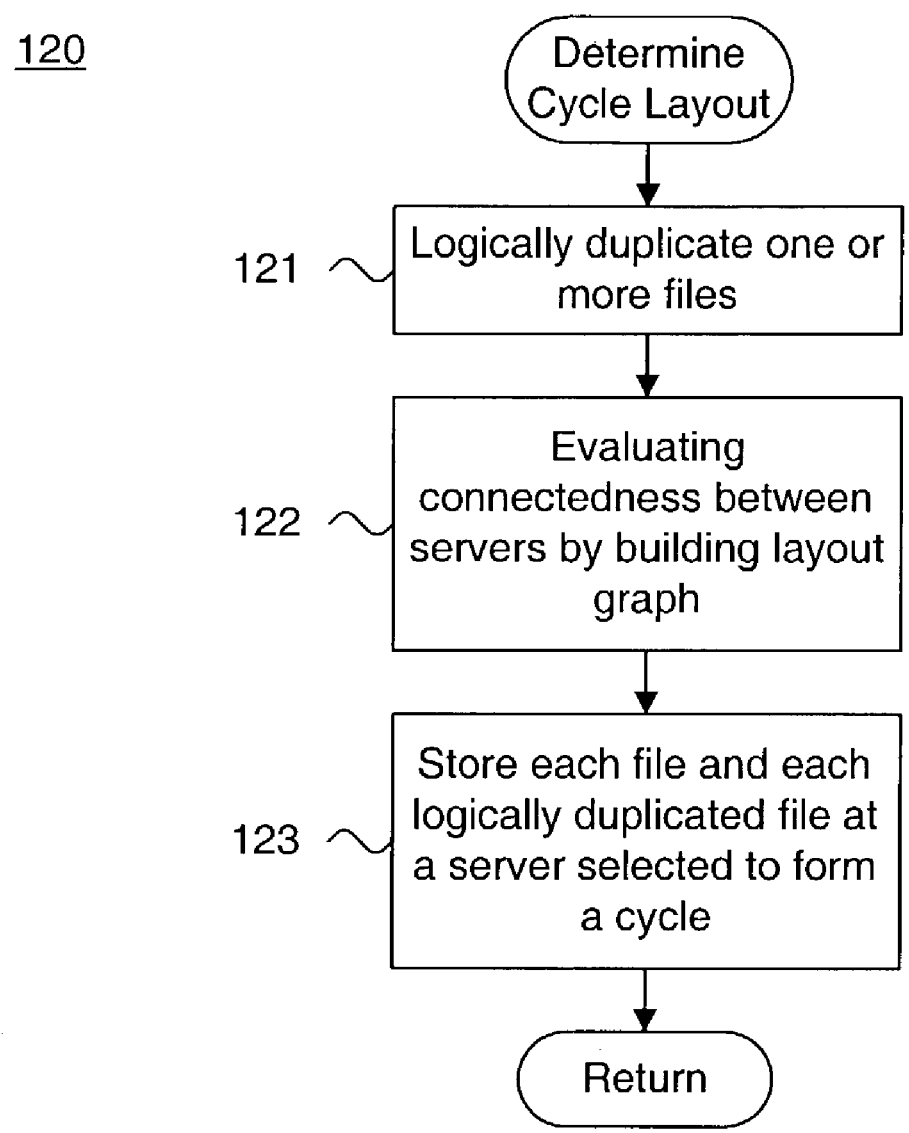
FIG. 13 is a flow diagram showing a routine for determining a cycle layout for use in the method of FIG. 10.

FIG. 13 is a flow diagram showing a routine 120 for determining a cycle layout for use in the method 90 of FIG. 10. The cycle layout assigns files 51 to servers 28*a-e* selected to form a cycle connecting every node in the layout graph 54.

First, one or more files 51 are logically duplicated from the set of files required by one or more operation 36 (block 121). The connectedness between the servers 28*a-e* is evaluated by building a layout graph 54 (block 122), such as described above with reference to FIG. 9. Finally, each "original" file 48 and duplicate file 49 is stored at a server 28*a-e* selected based on the layout graph 54 to form a cycle connecting every node (block 123). The cycle layout is complete and the routine returns.

Cycle Greedy Layout Determination

Figure 14:
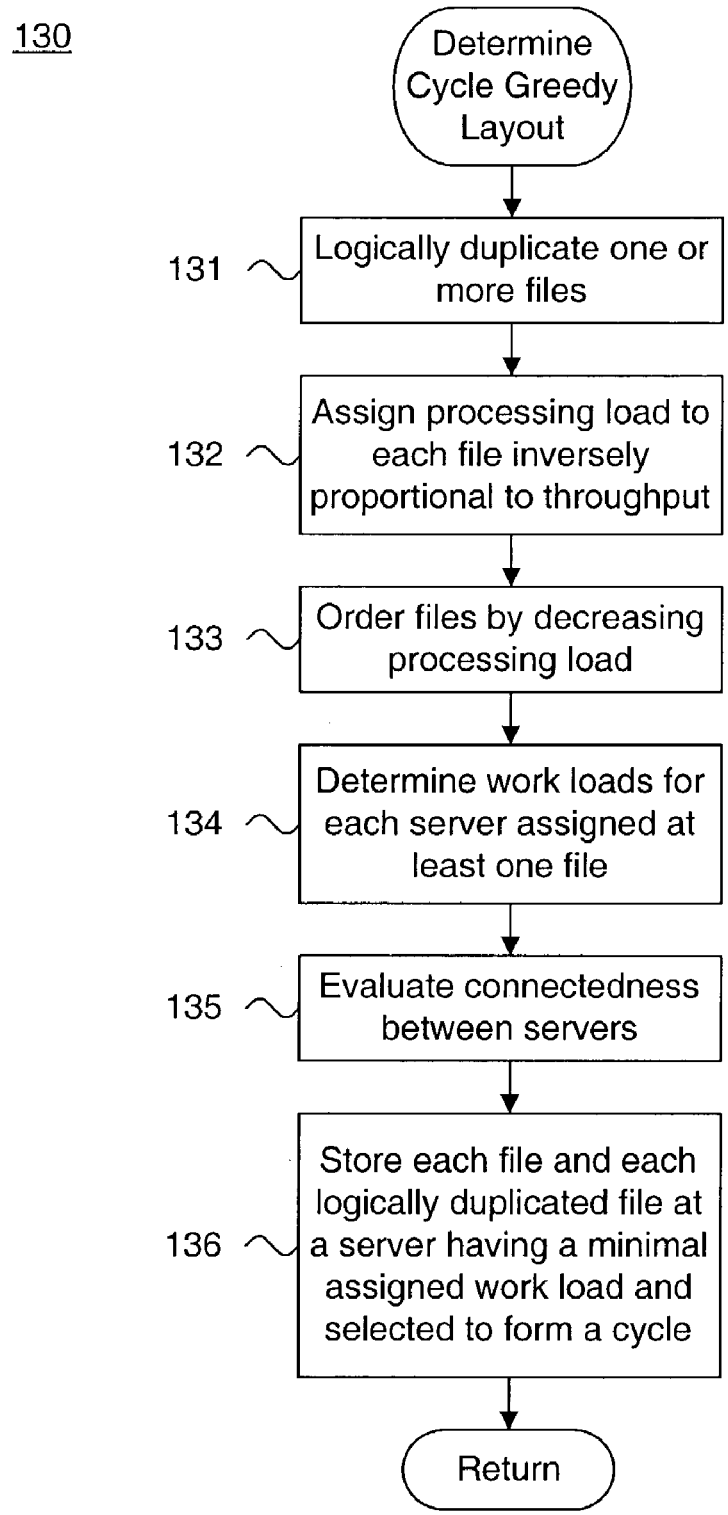
FIG. 14 is a flow diagram showing a routine for determining a cycle greedy layout for use in the method of FIG. 10.

FIG. 14 is a flow diagram showing a routine 130 for determining a cycle greedy layout for use in the method 90 of FIG. 10. The cycle greedy layout assigns files 51 to servers 28*a-e* having minimal assigned work loads and selected to form a cycle connecting every node in the layout graph 54.

First, one or more files 51 are logically duplicated from the set of files required by one or more operation 36 (block 131). A processing load 52 is assigned to each file 51 (block 132). In the described embodiment, the assigned processing load 52 consists of the inverse of the throughput required to process the original file 51. The files 51 are ordered, preferably by decreasing assigned processing load 52 (block 133). An assigned work load 47 is determined for each server 28*a-e* assigned at least one file 51 (block 134). The connectedness between the servers 28*a-e* is evaluated by building a layout graph 54 (block 135), such as described above with reference to FIG. 9. Finally, each "original" file 48 and duplicate file 49 is stored at a server 28*a-e* having a minimal assigned work load 47 and selected based on the layout graph 54 to form a cycle connecting every node (block 136). The greedy cycle layout is complete and the routine returns.

Basic Execution Scheduling

Figure 15:
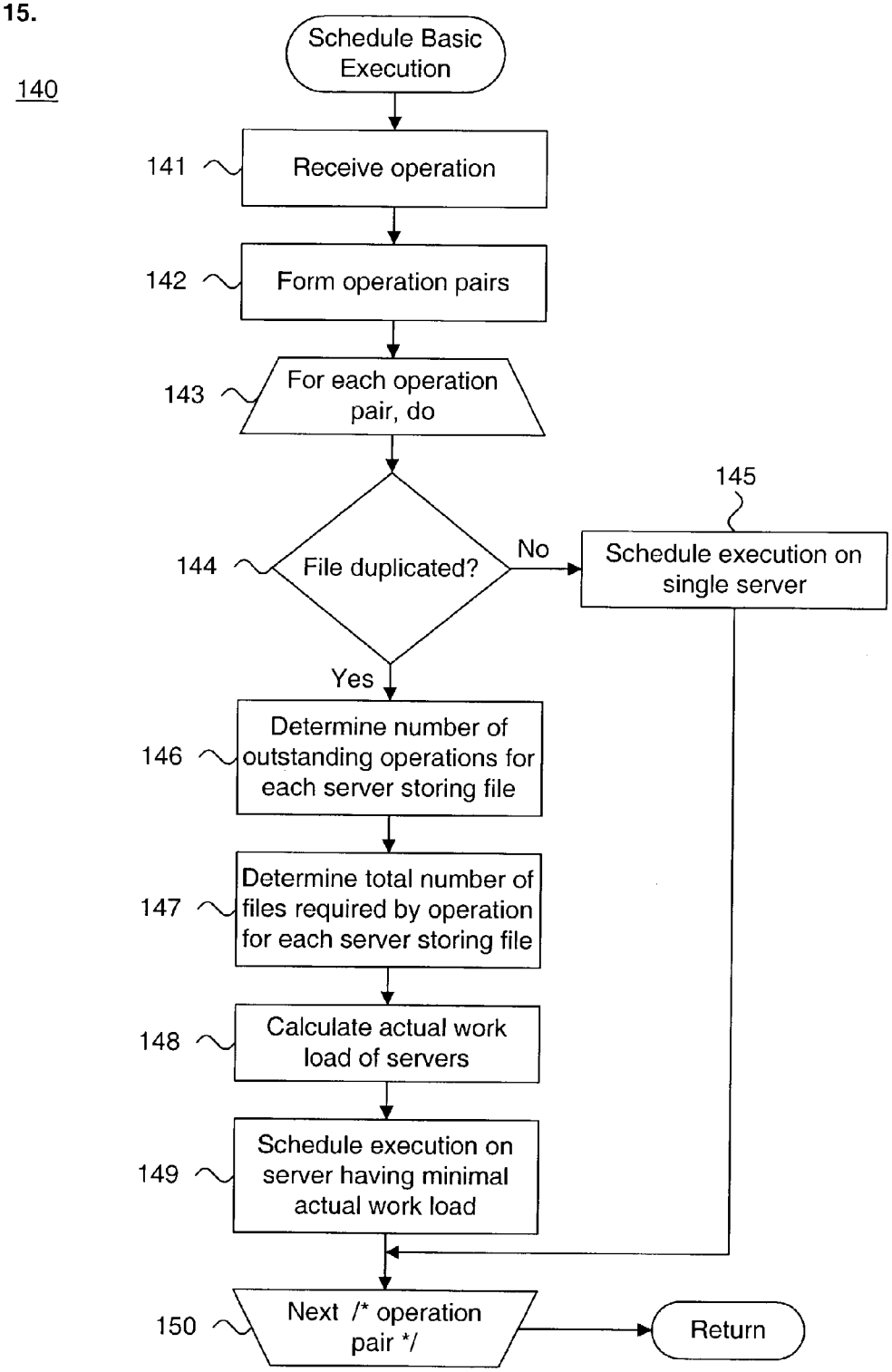
FIG. 15 is a flow diagram showing a routine for scheduling basic execution for use in the routine of FIG. 10.

FIG. 15 is a flow diagram showing a routine 140 for scheduling basic execution for use in the method 90 of FIG.

10. Basic execution schedules execution independent of the actual work loads 61 for each server 28a-e.

First, an operation 36 is received (block 141) and formed into an operation pair 59 (block 142), as described above with reference to FIG. 2. Each operation pair 59 is processed in an iterative loop (blocks 143-150), as follows. During each iteration (block 143), if the file 51 corresponding to the file identifier 33 matched to the operation 32 is not duplicated (block 144), execution is scheduled on the server 28a-e at which the non-duplicated file 51 is stored (block 145) and processing continues with the next operation pair (block 150).

Otherwise, if the file 51 corresponding to the file identifier 33 matched to the operation 32 is duplicated (block 144), the number of outstanding operations for each server 28a-e storing the file 51 is determined from the load data 61 (block 146). Also, the total number of files required by the operation 36 on each server 28a-e storing the file 51 is determined (block 147). The actual work loads 61 for each server 28a-e is calculated (block 148). In the described embodiment, each actual work load 61 is calculated as the product of the number of outstanding operations on a given server 28a-e times the number of files 51 required by the operation 36 on the given server 28a-e. Execution is scheduled on the server 28a-e having a minimal actual work load (block 149) and processing continues with the next operation pair (block 150). The routine returns upon the completion of processing of all operation pairs 59.

Dynamic Execution Scheduling

Figure 16:
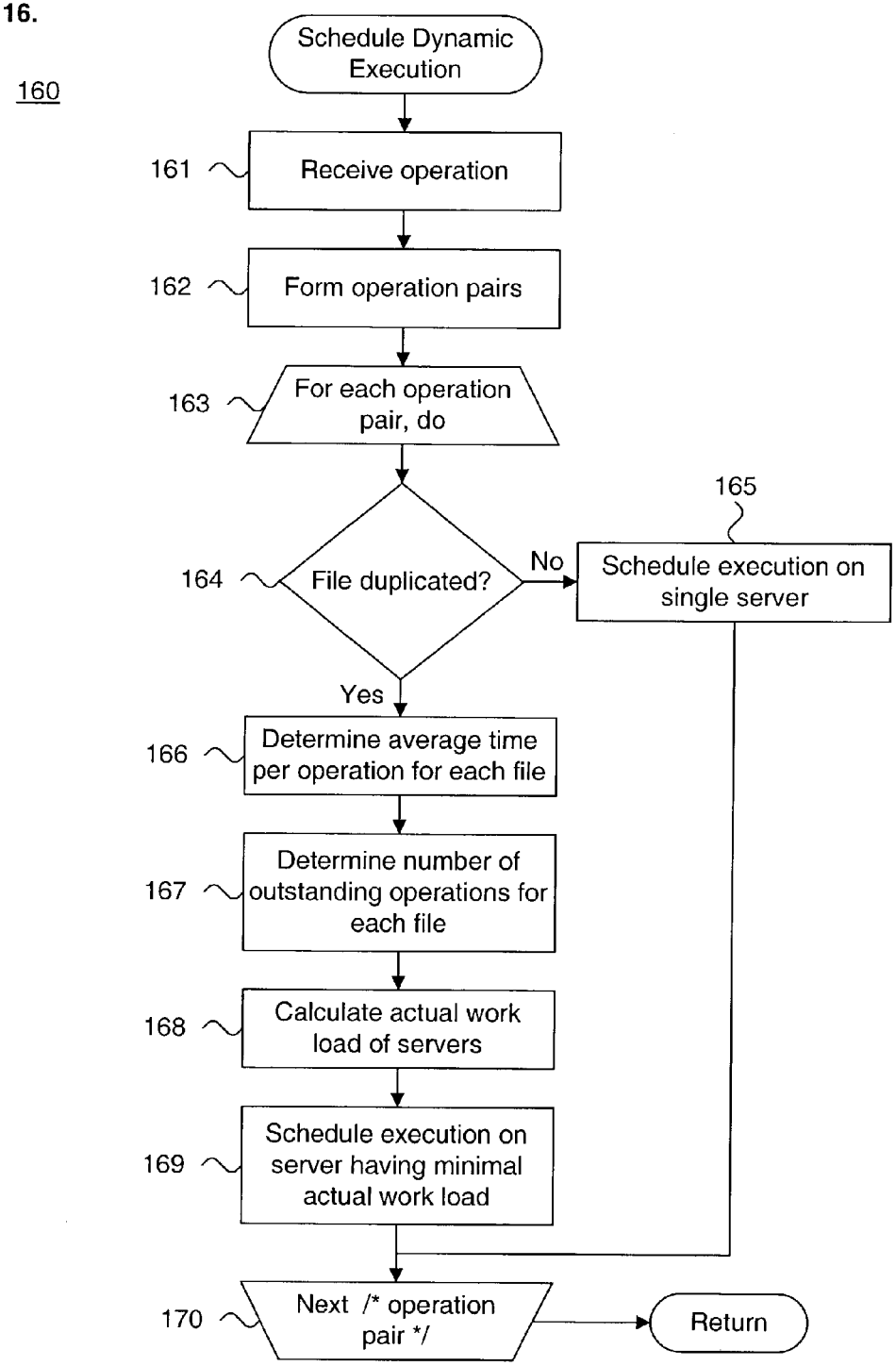
FIG. 16 is a flow diagram showing a routine for scheduling dynamic execution for use in the routine of FIG. 10.

FIG. 16 is a flow diagram showing a routine 160 for scheduling dynamic execution for use in the method 90 of FIG. 10. Dynamic execution schedules execution based on the actual work loads 61 of the servers 28a-e.

First, an operation 36 is received (block 161) and formed into an operation pair 59 (block 162), as described above with reference to FIG. 2. Each operation pair 59 is processed in an iterative loop (blocks 163-170), as follows. During each iteration (block 163), if the file 51 corresponding to the file identifier 33 matched to the operation 32 is not duplicated (block 164), execution is scheduled on the server 28a-e at which the non-duplicated file 51 is stored (block 165) and processing continues with the next operation pair (block 150).

Otherwise, if the file 51 corresponding to the file identifier 33 matched to the operation 32 is duplicated (block 164), the average time per operation for each file 51 is determined from the load data 61 (block 166). Also, the number of outstanding operations for each file 51 is determined from the load data 61 (block 167). Note the average time per operation could depend on the file or on the file and the server 28a-e, if the individual servers 28a-e execute at different processing speeds. The actual work loads 61 for each server 28a-e is calculated (block 168). In the described embodiment, the actual average work load 61 on each server 28a-e is computed as the sum, over all files 51 on the server 28a-e, of the number of outstanding requests for that file 51 on the server 28a-e times the average processing time for the file 51. Execution is scheduled on the server 28a-e having a minimal actual work load (block 169) and processing continues with the next operation pair (block 170). The routine returns upon the completion of processing of all operation pairs 59.

While the invention has been particularly shown and described as referenced to the embodiments thereof, those skilled in the art will understand that the foregoing and other changes in form and detail may be made therein without departing from the spirit and scope of the invention.

What is claimed is:

1. A method of providing load balanced processing of operations, comprising:
   receiving a sequence of operation requests from one or more clients;
   providing load balanced processing of the sequence of operation requests and avoiding load imbalances among a set of servers, including processing each operation request of the sequence of operation requests in accordance with current workloads of the set of servers, the processing of a respective operation request from a respective client including:
      determining a set of files the operation requires;
      distributing the operation over a plurality of servers in accordance with the current workloads, including, for each file in a plurality of files, in the set of files, separately determining a current workload for each server having a copy of the file, and dispatching a request that identifies the operation and the file, to a server that has a copy of the file and minimum current workload;
      receiving intermediate results from each dispatched request;
      processing the intermediate results into a single result set; and
      returning the single result set to the respective client.

2. The method of claim 1, wherein determining a current workload for each server having a copy of the file includes determining a number of outstanding operations at each server having a copy of the file.

3. The method of claim 1, further comprising;
   prior to receiving the sequence of operation requests:
      identifying a plurality of servers;
      identifying a plurality of files; and
      storing each file onto one or more servers of the plurality of servers;
      wherein a layout graph depicting the files and servers includes nodes representing the plurality of servers and edges representing the plurality of files, wherein each edge represents a respective file of the plurality of files and has ends at nodes corresponding to servers storing copies of the respective file, and furthermore wherein every server in the plurality of servers is connected to every other server in the plurality of servers by a sequence of one or more of the edges.

4. The method of claim 3, including constructing the layout graph and storing file copies onto the servers in accordance with the layout graph.

5. The method of claim 3 wherein the files are distributed so that the number of files on any server differs by at most one from the number of files on any other server.

6. The method of claim 3 wherein;
   a processing load is calculated for each file; and
   the files are assigned to servers to minimize differences between servers with respect to a sum of the processing loads of all of the files stored on each server.

7. The method of claim 3 wherein the edges in the layout graph form a single cycle that includes all of the nodes.

8. A computer readable storage medium storing one or more computer programs to be executed by a computer so as to perform a process, the one or more computer programs comprising:
   instructions to receive a sequence of operation requests from one or more clients;

instructions to distribute the operation over a plurality of servers in accordance with the current workloads, including, instructions to provide load balanced processing of the sequence of operation requests and avoiding load imbalances among a set of servers, including instructions to process each operation request of the sequence of operation requests in accordance with current workloads of the set of servers, the instructions to process a respective operation request from a respective client including:

instructions to determine a set of files the operation requires;

instructions to separately determine, for each file in a plurality of files in the set of files, a current workload for each server having a copy of the file, and to dispatch a request that identifies the operation and the file, to a server that has a copy of the file and minimum current workload;

instructions to receive intermediate results from each dispatched request;

instructions to process the intermediate results into a single result set; and instructions to returning the single result set to the respective client.

9. The computer readable storage medium of claim 8, wherein determining a current workload for each server having a copy of a file in the set of files includes determining a number of outstanding operations at each server having a copy of a file in the set of files.

10. The computer readable storage medium of claim 8, further comprising:

instructions to identify a plurality of servers;

instructions to identify a plurality of files; and instructions to store each file onto one or more servers of the plurality of servers;

wherein a layout graph depicting the files and servers includes nodes representing the plurality of servers and edges representing the plurality of files, wherein each edge represents a respective file of the plurality of files and has ends at nodes corresponding to servers storing copies of the respective file, and furthermore wherein every server in the plurality of servers is connected to every other server in the plurality of servers by a sequence of one or more of the edges.

11. The computer readable storage medium of claim 10, further including instructions to construct a layout graph and to store file copies onto the servers in accordance with the layout graph.

12. The computer readable storage medium of claim 10, further including instructions to distribute the files so that the number of files on any server differs by at most one from the number of files on any other server.

13. The computer readable storage medium of claim 10, further including;

instructions to calculate a processing load for each file; and instructions to assign the files to servers to minimize differences between servers with respect to a sum of the processing loads of all of the files stored on each server.

14. The computer readable storage medium of claim 10, further including instructions to form the edges in the layout graph as a single cycle that includes all of the nodes.

* * * * *